J. D. BABB.
COMBINED HALTER AND YOKE.
APPLICATION FILED MAY 24, 1911.
1,077,251.
Patented Nov. 4, 1913.
2 SHEETS—SHEET 1.
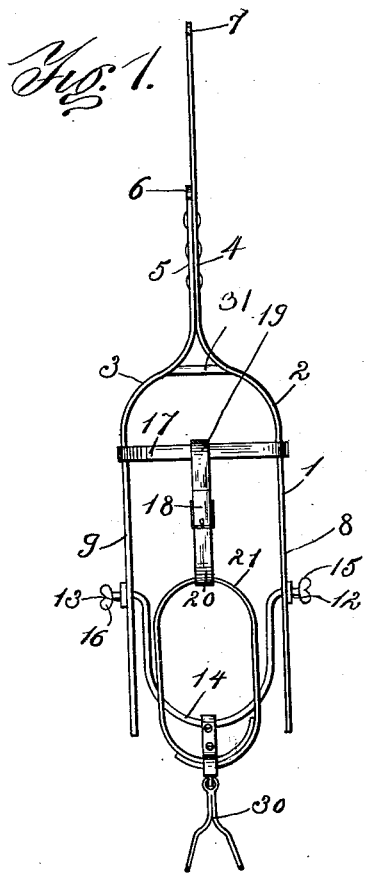
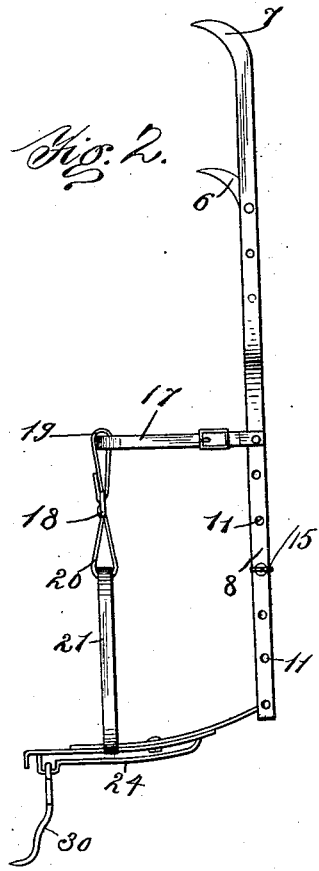
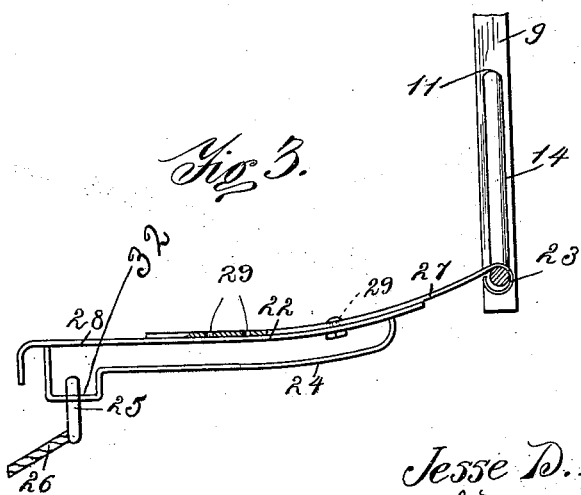
WITNESSES
INVENTOR
Jesse D. Babb
Attorney

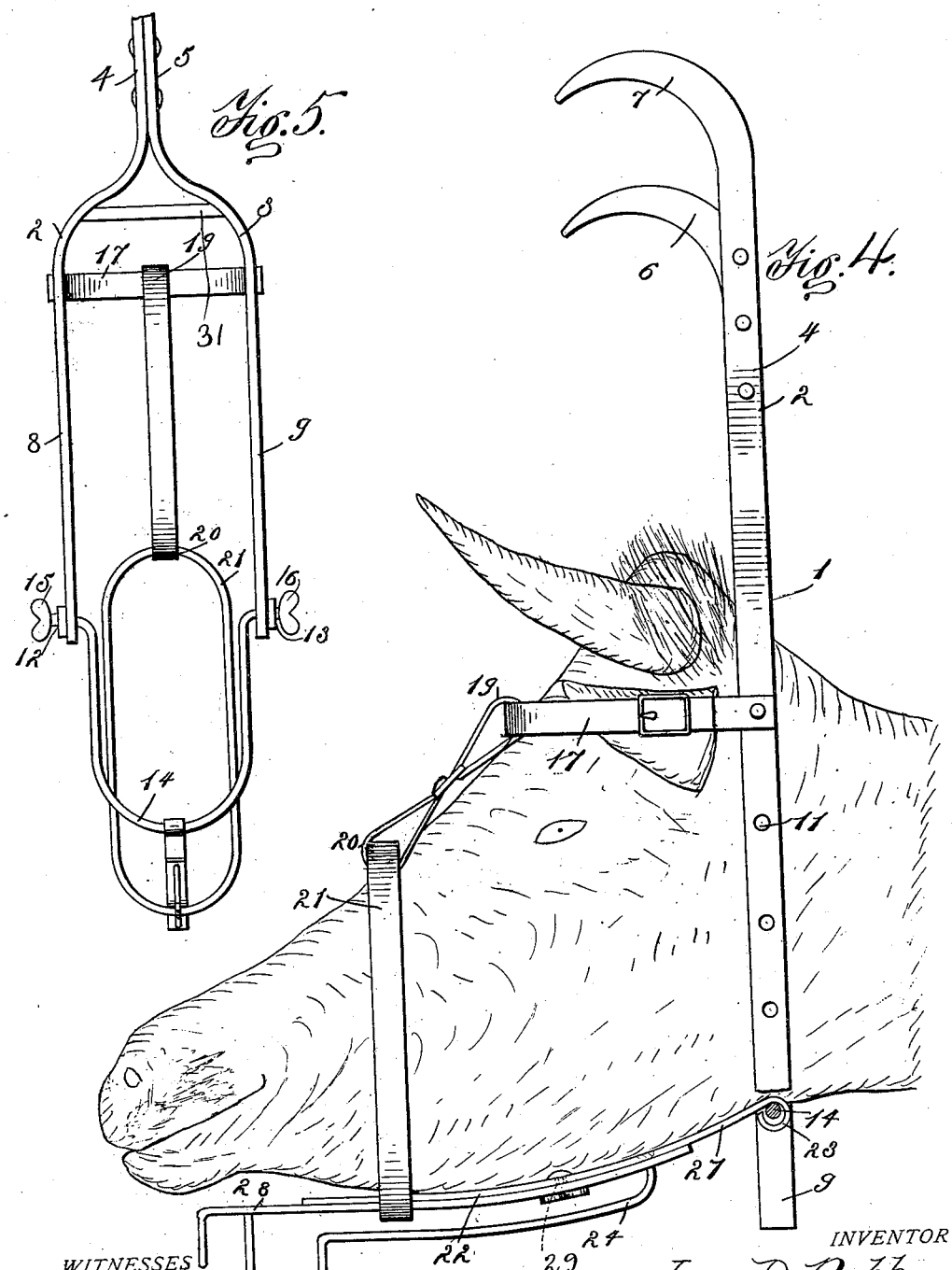

UNITED STATES PATENT OFFICE.

JESSE DARBY BABB, OF DALLAS, GEORGIA.

COMBINED HALTER AND YOKE.

1,077,251.  Specification of Letters Patent.  Patented Nov. 4, 1913.

Application filed May 24, 1911. Serial No. 629,136.

*To all whom it may concern:*

Be it known that I, JESSE D. BABB, citizen of the United States, residing at Dallas, in the county of Paulding and State of Georgia, have invented certain new and useful Improvements in Combined Halters and Yokes, of which the following is a specification.

This invention relates to halters or yokes and it has for its object to provide a combined halter and yoke so adjustable that it can be made to fit snugly either cow or horse, large or small.

Another object of the invention is to provide a yoke which when adjusted to the head of an animal will prevent it from forcing its way through wire fences.

With the above and other objects in view, I have invented the device illustrated in the accompanying drawings in which, Figure 1 is a front elevation of my invention, Fig. 2 is a side elevation thereof, Fig. 3 is an enlarged detail of a yoke, in section, and a connecting member, Fig. 4 is an enlarged side elevation showing it adjusted to the head of an animal, and, Fig. 5 is a rear elevation showing the device in a differently adjusted position from that shown in the other views.

Referring to the accompanying drawings in which 1 indicates a collar composed of the members 2 and 3 riveted together at the upper part and spread apart below the riveting to fit the neck of an animal. The portions 4 and 5 are of different lengths and the ends thereof are curved forward to form hooks 6 and 7 which are adapted to hook against the wires of a fence should the animal wearing the device attempt to push its way therethrough, it will prevent its doing so.

The depending portions 8 and 9 of the members 2 and 3 are provided with openings 11 into which the ends 12 and 13 of the U-shaped yoke 14 are adapted to pass, whereby said yoke may be raised or lowered to be adjusted to an animal. In the ends 12 and 13 are openings to receive the keys 15 and 16, which hold the yoke member to the collar member. An adjustable band 17 is also secured to the members 2 and 3 and to this band is fastened a strap 18 by its end 19, the other end 20 of which engages the loop 21 which is also adjustable around the jaws of the animal. This loop engages the outer part of an adjustable connecting member 22, the rear end 23 of which is pivotally secured to the yoke 14. A member 24 is secured to the connecting member 22, whereby a ring 25 to which a rope 26 is secured, is secured to the member 24, thus the animal may be led.

The yoke is pivoted to its bearing members and has a swinging motion so as not to interfere with the animal's neck. The connecting member 22 is mounted on the yoke loosely, so as to have free lateral motion thereon so the animal may freely move its head from side to side. This member is composed of two metal strips 27 and 28 having openings 29 therein whereby their length may be readily adjusted. Depending from the member 24 is a double hook 30 which is adjusted to catch the lower wires of a fence should the animal attempt to get through. This hook is slidable on the member 24 whereby it may be readily moved to the rear portion thereof so as not to interfere with the animal when feeding from a trough. If the hook were not slidable on said member 24 it would catch on the edge of a trough and prevent the animal from reaching the food. The depression in the forward end will normally hold the hook at the forward end of the member 24 whereby the animal will not even be able to get its head between the strands of a wire or rail fence. The hook 30 may be caught over the member 14 when the animal is feeding so as to hold it out of the way.

31 is a pad of leather or other suitable material adapted to rest on the neck of the animal and prevent injury thereto.

I claim and desire to secure by Letters Patent:—

1. A halter comprising a rigid collar terminating in a projecting hooked member, a forehead strap adapted to hold said collar and hooked member in a vertical position, and a hook-supporting member depending from said collar, said hook being slidable on said member.

2. A halter comprising a rigid collar terminating in a projecting hooked member, a forehead strap adapted to hold said collar and hooked member in a vertical position, a hook-supporting member depending from said collar, said hook being slidable on said member, and means for holding said hook normally in an outer position on said member.

3. A halter comprising a rigid collar terminating in a projecting hooked member, a forehead strap adapted to hold said collar and hooked member in a vertical position, a hook-supporting member depending from said collar, said hook being slidable on said member, means for holding said hook normally in an outer position on said member, and a nose strap adapted to hold said member in a horizontal position.

4. A halter comprising a rigid collar terminating in a projecting hooked member, a forehead strap adapted to hold said collar and hooked member in a vertical position, a hook-supporting member depending from said collar, said hook being slidable on said member, means for holding said hook normally in an outer position on said member, a nose strap adapted to hold said member in a horizontal position, and means for connecting said nose strap and said forehead strap.

In testimony whereof I affix my signature in presence of two witnesses.

JESSE DARBY BABB.

Witnesses:
JOSEPH W. CRATON,
FRANKLIN P. HUDSON.

---

Copies of this patent may be obtained for five cents each, by addressing the "Commissioner of Patents, Washington, D. C."